United States Patent
Riva et al.

(10) Patent No.: US 8,287,746 B2
(45) Date of Patent: Oct. 16, 2012

(54) PROCESS FOR MANUFACTURING AN INTERACTION STRUCTURE FOR A STORAGE MEDIUM

(75) Inventors: Caterina Riva, Cusago (IT); Bruno Murari, Monza (IT); Giovanni Frattini, Travaco' Siccomario (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 804 days.

(21) Appl. No.: 12/246,384

(22) Filed: Oct. 6, 2008

(65) Prior Publication Data

US 2009/0095705 A1 Apr. 16, 2009

Related U.S. Application Data

(63) Continuation-in-part of application No. PCT/IT2006/000229, filed on Apr. 6, 2006.

(51) Int. Cl.
*H01B 13/00* (2006.01)
(52) U.S. Cl. ............................ 216/13; 438/197; 438/239
(58) Field of Classification Search .................... 216/13; 257/E21.39, E21.236, E21.646; 438/197, 438/239
See application file for complete search history.

(56) References Cited

U.S. PATENT DOCUMENTS

| | | | |
|---|---|---|---|
| 5,179,533 A | 1/1993 | Bullington et al. | |
| 6,477,132 B1 | 11/2002 | Azuma et al. | |
| 6,515,957 B1 | 2/2003 | Newns et al. | |
| 7,397,624 B2 | 7/2008 | Johns et al. | |
| 7,447,140 B2 | 11/2008 | Lutwyche et al. | |
| 2005/0013230 A1 | 1/2005 | Adelmann | |
| 2005/0128616 A1 | 6/2005 | Johns et al. | |
| 2005/0152249 A1 | 7/2005 | Fukunaga et al. | |
| 2006/0245312 A1 | 11/2006 | Maeda et al. | |
| 2007/0045712 A1* | 3/2007 | Haller et al. | 257/315 |
| 2007/0231985 A1* | 10/2007 | Forbes | 438/197 |
| 2008/0316906 A1 | 12/2008 | Bollati et al. | |
| 2009/0095705 A1 | 4/2009 | Riva et al. | |

* cited by examiner

*Primary Examiner* — Nadine G Norton
*Assistant Examiner* — Mahmoud Dahimene
(74) *Attorney, Agent, or Firm* — Seed IP Law Group PLLC (57) ABSTRACT

A process manufactures an interaction structure for a storage medium. The process includes forming a first interaction head provided with a first conductive region having a sub-lithographic dimension. The step of forming a first interaction head includes: forming on a surface a first delimitation region having a side wall; depositing a conductive portion having a deposition thickness substantially matching the sub-lithographic dimension on the side wall; and then defining the conductive portion. The sub-lithographic dimension preferably is between 1 and 50 nm, more preferably 20 nm.

37 Claims, 4 Drawing Sheets

PROCESS FOR MANUFACTURING AN INTERACTION STRUCTURE FOR A STORAGE MEDIUM

CROSS-REFERENCE TO RELATED APPLICATION

This application is a continuation-in-part of International Patent Application No. PCT/IT2006/000229, filed Apr. 6, 2006, now pending, which application is incorporated herein by reference in its entirety.

BACKGROUND

1. Technical Field

The present invention relates to a process for manufacturing an interaction structure for a storage medium, in particular for "probe storage" applications, to which the ensuing treatment will make explicit reference without, however, this implying any loss of generality.

2. Description of the Related Art

As is known, storage systems using a magnetism-based technology, such as, for example, hard disks, suffer from major limitations as regards the increase in data-storage capacity, the read/write speed, and size reduction. In particular, a physical limit exists, referred to as "superparamagnetic limit", which hinders reduction in the dimensions of the magnetic-storage domains below a critical threshold without running the risk of losing the stored information.

In the last few years alternative storage systems have consequently been proposed, amongst which the so-called "probe storage" systems (referred to also as "atomic storage" systems) have assumed particular importance. These systems enable high data-storage capacities to be achieved with small overall dimensions and with low manufacturing costs.

In brief (see FIG. 1), a "probe storage" device comprises a two-dimensional array of transducers (or probes) 2 fixed to a common substrate 3, made, for example, of silicon, arranged above a storage medium 4 and movable with respect to the storage medium, generally in two orthogonal directions, due to the action of a micromotor associated therewith. Each transducer 2 is provided with a supporting element 5 made of semiconductor material, in particular silicon, generally known as "cantilever", which is suspended in cantilever fashion above the storage medium 4 and carries at one free end an interaction structure 6 (referred to also as "sensor structure" or "contact structure") facing the storage medium 4. In particular, by the term "interaction" is meant herein any operation of reading, writing or erasure that implies an exchange of signals between the interaction structure and the storage medium. Via the respective interaction structure 6, each transducer 2 is able to interact locally with a portion of the storage medium, for reading/writing/erasing individual bits of information.

Figure 1:
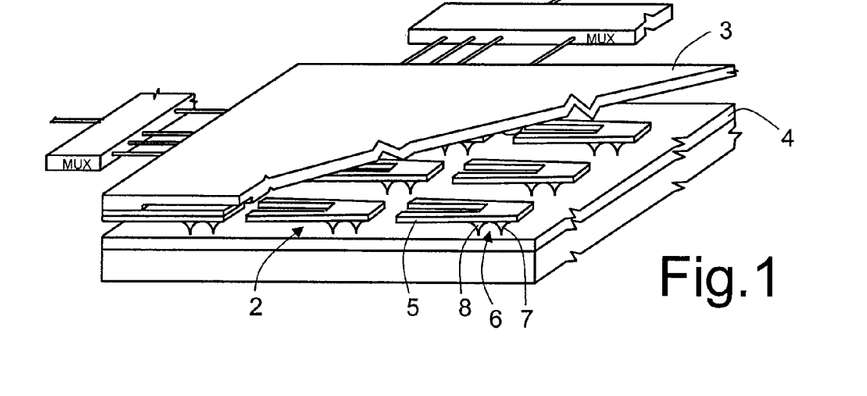
FIG. 1 is a partially exploded schematic perspective representation of a probe-storage device.

The physical characteristics (hardness, roughness, etc.), morphological characteristics (dimensions, shape, etc.), and electrical characteristics (resistivity, thermal conductivity, etc.) of the interaction structure 6 are strictly correlated to the material of the storage medium with which they are associated (polymeric material, ferroelectric material, phase-change material, etc.), and to the mechanisms of interaction for reading/writing/erasing of data (thermal process, passage of charge, etc.).

For example, in some storage systems of the "probe storage" type reading/writing of the individual bits is carried out by interacting with the storage material via a passage of electrical charges through the interaction structure. In particular, in the case where ferroelectric storage media are used, the read operations are destructive, i.e., they imply removal of the stored information and the impossibility for carrying out any subsequent reading of the same data. In fact, reading of a portion of the memory (or trace) corresponds to writing in said portion of memory a sequence of charges that are all positive (or all negative, according to the polarization of an interaction structure). Consequently, during reading, the flow of the read data is stored in a memory buffer, the dimensions of which are at least the same as the dimensions of the trace that is being read. In addition, the contents of the memory buffer are subsequently re-written on the previously read trace, so that the interaction structure is re-positioned at the beginning of the trace, re-writes the entire trace, and subsequently can start a new read operation.

BRIEF SUMMARY

One embodiment is a manufacturing process that enables the aforesaid problems and disadvantages to be overcome, and in particular that enables definition of an interaction head of nanometric dimensions without resorting to the use of a purely lithographic process.

A process for manufacturing an interaction structure for a storage medium is provided, as defined in claim 1.

BRIEF DESCRIPTION OF THE SEVERAL VIEWS OF THE DRAWINGS

For a better understanding of the present invention, preferred embodiments thereof are now described, purely by way of non-limiting example and with reference to the attached plate of drawings, wherein.

DETAILED DESCRIPTION

In order to solve the problem of re-writing after a destructive read, in the co-pending patent application No. PCTIT06000114 filed on Feb. 27, 2006 in the name of the present assignee, the use has been proposed of an interaction structure 6 comprising two adjacent interaction heads (designated by 7 and 8 in FIG. 1) aligned with respect to one another in a scanning direction, which move in line in one and the same scanning direction with respect to the storage medium. A first interaction head 7 is a read head, which reads the data stored in a given position and consequently erases them, whereas a second interaction head 8 is a write head, which follows the read head and restores and re-writes the data previously erased.

The process for manufacturing a probe-storage device envisages, in a known way, the formation of the array of transducers 2 on a silicon-on-insulator (SOI) wafer, using MEMS microfabrication techniques enabling the release of the various cantilever supporting elements from an epitaxial layer of the SOI wafer. Up to now, completely satisfactory processes for manufacturing the interaction structures 6 associated to the various transducers 2 have not, however, been proposed. In addition, the manufacturing processes of a known type do not envisage fabrication of a number of interaction heads integrated on a same supporting element.

In particular, since the distance between the ferroelectric domains, and hence between subsequent bits stored on the storage medium (referred to also as "bit pitch"), can reach values of the order of some tens of nanometers, in order to obtain devices with high capacities, the interaction heads have at least one dimension compatible with said distance, so that also this dimension can be in the order of some tens of nanometers (for example, 20 nm). Consequently, traditional lithographic techniques prove inadequate for providing these heads, or involve, in any case, considerable costs for their fabrication (in the case where the dimensions, though still compatible with the lithographic limits, require use of costly apparatuses to achieve a lithographic definition of less than 100 nm).

As will be described in detail hereinafter, one embodiment envisages definition of a sub-lithographic dimension of an interaction structure for a storage medium (which is once again designated by the reference number 6, as in FIG. 1), via a non-lithographic process, in particular, via deposition of one or more layers having appropriate thicknesses. Current deposition techniques enable, in fact, formation of very thin layers (having sub-lithographic thicknesses), which can be controlled with extreme precision. It should be noted that the expression "sub-lithographic dimension" is used herein to indicate a dimension smaller than a minimum dimension obtained with a lithographic technique; for example, a sub-lithographic dimension is smaller than 50 nm. In one embodiment, the sub-lithographic dimension is approximately 20 nm.

Figure 2:
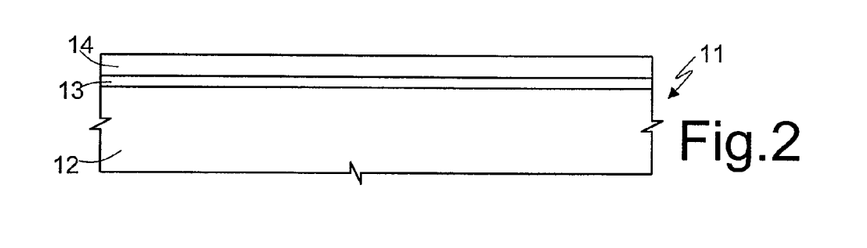
FIGS. 2-10 show perspective sections of a wafer of semiconductor material on insulator in successive steps of a manufacturing process according to a first embodiment of the present invention.

The process for manufacturing an interaction structure 6 for interaction with a storage medium 4 according to a first embodiment of the present invention envisages (FIG. 2) formation of a wafer of semiconductor material on insulator (SOI wafer) 11, comprising a substrate 12 (which is not shown in the subsequent figures), for example made of silicon, a buried-oxide layer 13 (which is not shown in the subsequent figures either), and an epitaxial layer 14, for example made of silicon. In particular, in a per-se known manner, within the epitaxial layer 14 a supporting element 5 for the interaction structure 6 will be formed, and the thicknesses of the epitaxial layer 14 and of the buried-oxide layer 13 are consequently chosen according to the mechanical and electrical specifications that the supporting element must meet (in terms of resistivity, stiffness, etc.). For example, the epitaxial layer 14 has a thickness of 2-10 μm, and the buried-oxide layer 13 has a thickness of 0.5-2 μm.

Figure 3:
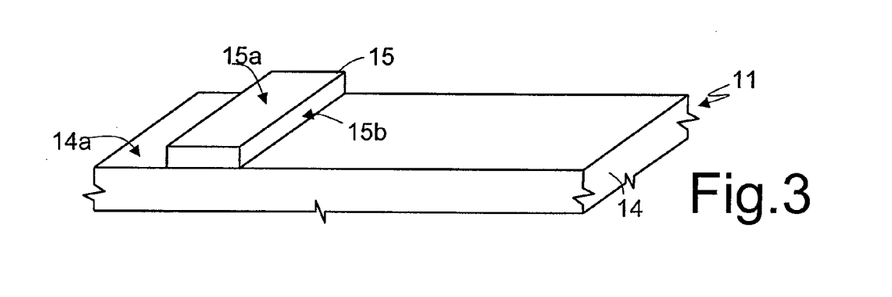

Next, a first insulating layer (not shown), for example made of silicon oxide or silicon nitride, is deposited on the epitaxial layer 14. The material of the first insulating layer should be compatible, in a known way, with a subsequent process of definition of the supporting element carrying the interaction structure, and of its release from the epitaxial layer 14. The first insulating layer is then defined via a dry etch through a purposely provided etching mask (not illustrated) so as to leave an insulation region 15 (FIG. 3) thereof, for example, having a rectangular section with non-critical dimensions (e.g., 5×50 μm). The insulation region 15 has a top wall 15a and side walls 15b, and defines a step having a vertical wall (side wall 15b) perpendicular to the top surface 14a of the epitaxial layer 14.

Figure 4:
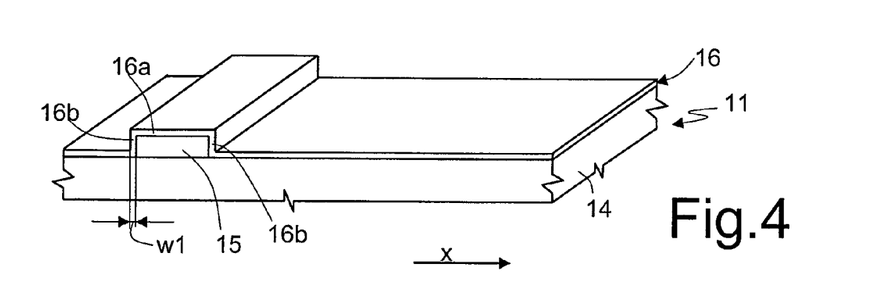

Next (FIG. 4), a conductive layer 16, having a thickness smaller than 50 nm, is deposited in a conformable manner, both on the insulation region 15 and on the epitaxial layer 14. The material of the conductive layer 16 is selected on the basis of parameters of resistivity, hardness, stability in temperature, compatibility with CMOS processes and good interface with the storage medium. For example, said material can be a metallic material, such as TiN or a compound thereof (TiN+x=TiNx).

Figure 8:
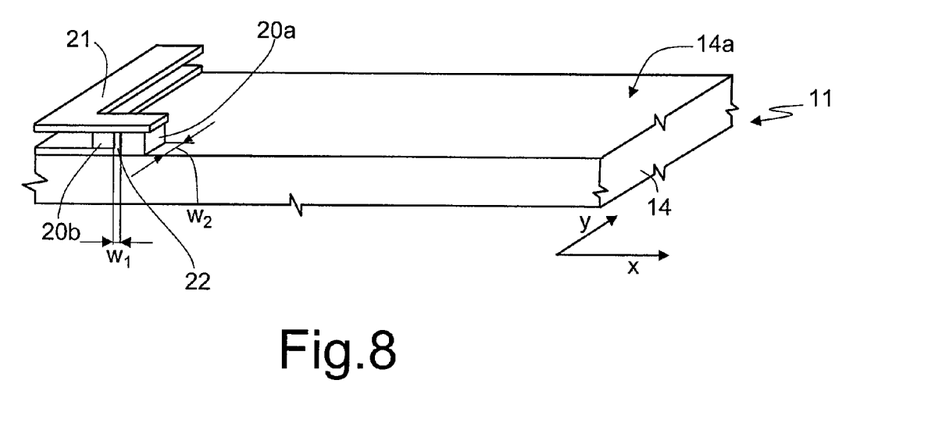

The conductive layer 16 coats in a substantially conformable manner the top wall 15a and the side walls 15b of the insulation region 15, respectively with a top portion 16a and with side portions 16b. As will be explained clearly hereinafter, a side portion 16b of the conductive layer 16 will provide a conductive region of a head of the interaction structure. In particular, the thickness of said layer will determine the pitch of the bits stored within the storage medium or, in a similar way, a smaller dimension $W_1$ (shown in FIG. 8) of the interaction head (in a first direction x of FIG. 4). In order to provide the conductive layer 16 an appropriate known technique of deposition, for example, a technique of chemical vapor deposition (CVD), is used, enabling a good step coverage and a good thickness control to be achieved.

Figure 5:
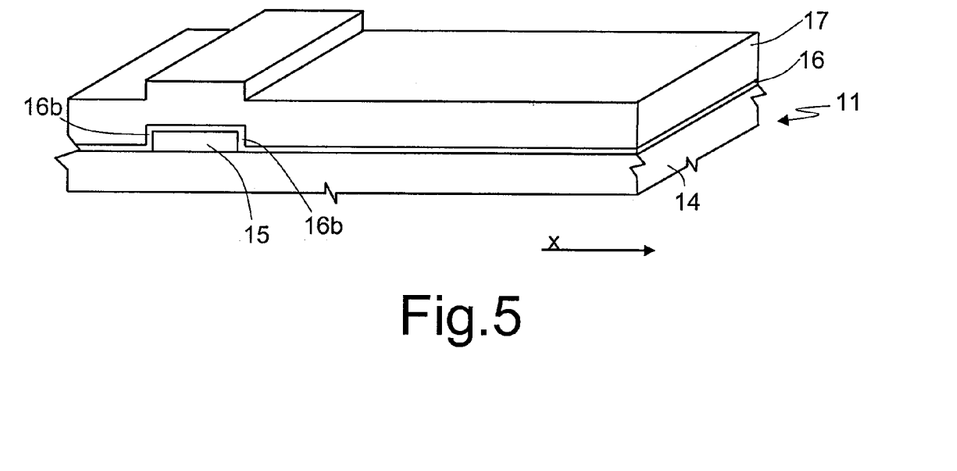

Next (FIG. 5), a second insulating layer 17, which is also made, for example, of silicon oxide or silicon nitride, is deposited above the conductive layer 16.

Figure 6:
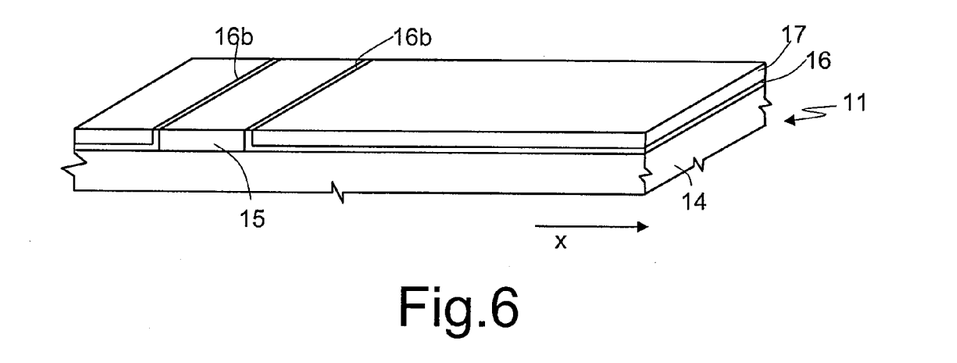

A step of planarization of the second insulating layer 17 and of the conductive layer 16 is then carried out (FIG. 6), for example with a technique of chemical-mechanical polishing (CMP). In particular, said planarization step brings about exposure of the insulation region 15 (and possibly a reduction in the height of said insulation region 15), and in addition exposure of the side portions 16b of the conductive layer 16.

Figure 7:
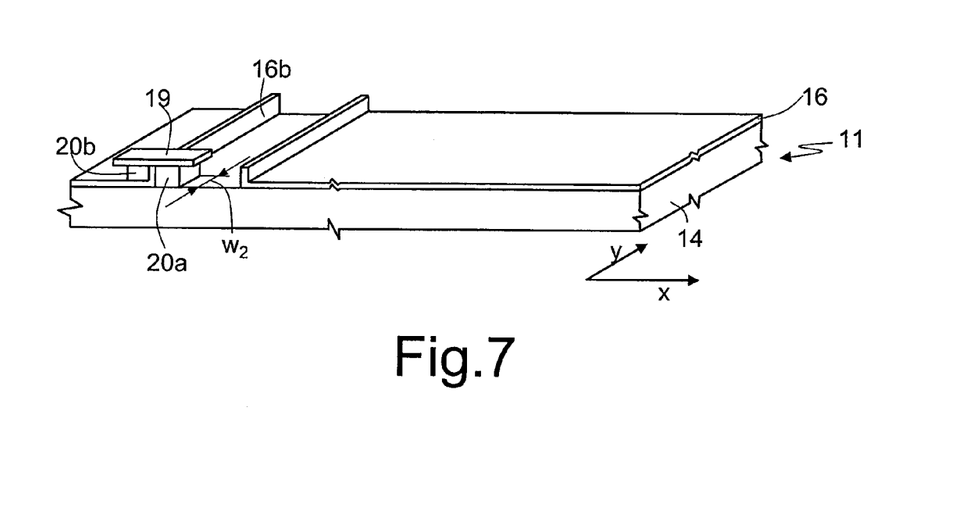

Next (FIG. 7), a first etching mask 19 is formed, and a partially isotropic wet etch is performed of the insulation portion 15 and of portions of the second insulating layer 17 that remain after the preceding planarization step. After the etching step, a first insulating portion 20a (which remains after etching of the insulation region 15) and a second insulating portion 20b (which remains after etching of the insulating layer 17) are formed, arranged on opposite sides of a first side portion 16b of the conductive layer 16. The dimensions of the first etching mask 19 are, for example, in the order of some hundreds of nanometers (for example, 200 nm×200 nm), and enable definition, together with the wet-etch parameters, of the dimensions of the insulating portions 20a, 20b in the first direction x and in a second direction y orthogonal to the first direction x. For example, the dimension in the second direction y of the insulating portions 20a, 20b is obtained by subtracting from a corresponding dimension of the first etching mask 19 (in this case 200 nm) an isotropic component of the etch, and typically will be of the order of tens of nanometers, for example, 80 nm.

A second etching mask 21 is then formed (FIG. 8), and a (partially isotropic) wet etch is performed of portions of the conductive layer 16 remaining after the preceding planarization step. The second etching mask 21 has typical minimum dimensions of the order of some hundreds of nanometers (for example, 200 nm) and covers the insulating portions 20a and 20b, part of the aforesaid first side portion 16b of the conductive layer 16, and a portion of the conductive layer connected thereto, whereas it leaves the remaining part of the conductive layer 16 exposed.

Figure 9:
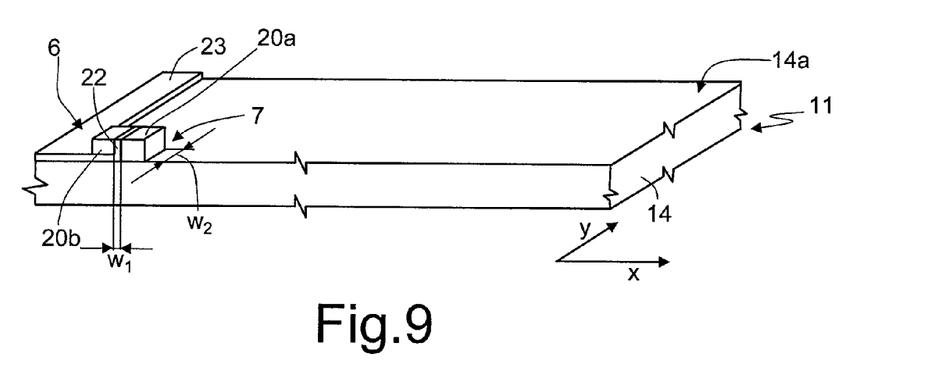

As is also shown in FIG. 9, after said etch a first conductive region 22 is defined, arranged between the first insulating portion 20a and the second insulating portion 20b, as well as a first conductive path 23 connected to the first conductive region 22 and set on the epitaxial layer 14; the second insulating portion 20b is arranged on the conductive path 23. In particular, the conductive region 22, together with the first and second insulating portions 20a, 20b form a first interaction head 7 of the interaction structure 6. In a per-se known manner, the first conductive region 22 enables electrical interaction with a corresponding storage medium 4 (for example, made of ferroelectric material), the conductive path 23 enables signals exchanged between the head and the storage medium 4 to be conveyed, and the first and second insulating portions 20a, 20b have the function of insulating the first conductive region 22 and of increasing its mechanical strength. The first conductive region 22 has a substantially rectangular cross section (in a plane parallel to the top surface 14a of the epitaxial layer 14) with a smaller dimension $W_1$, in the first direction x, of, for example, 20 nm, directly defined by the thickness of deposition of the conductive layer 16 (hence obtained by a non-lithographic process), and a larger dimension $W_2$, in the second direction y, of, for example, 80 nm, determined by a corresponding dimension of the second etching mask 21 and by an isotropic component of the corresponding etch. The first insulating portion 20a also protects the conductive region 22 from the aforesaid wet etch and contributes to defining its larger dimension $W_2$.

Figure 10:
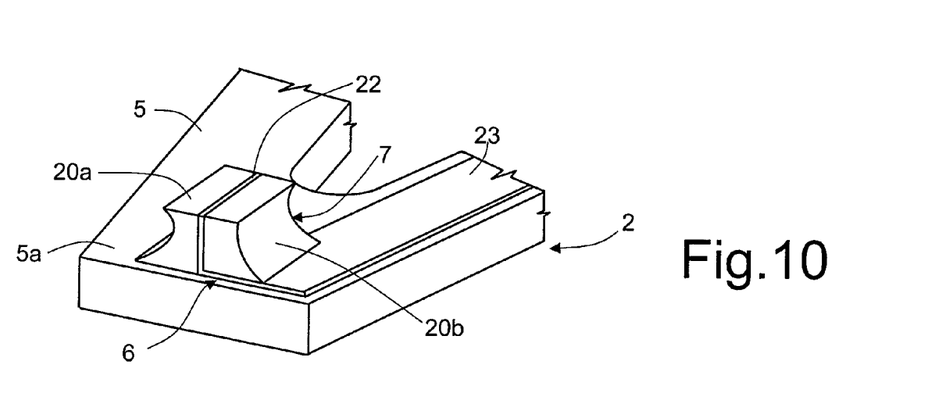

There follows a step (of a known type and for this reason not described in detail) of definition of the supporting element as a cantilever 5 of the transducer 2 for interaction with the storage medium 4 (as shown in FIG. 10, at an enlarged scale).

In particular, the supporting element 5 is released from the epitaxial layer 14 via MEMS processes of a standard type. The first interaction head 7 is defined on the supporting element 5 at a free end 5a thereof, and the first conductive path 23 extends along a portion of the supporting element 5.

A second embodiment of the present invention envisages exploitation of the process steps previously described for formation of a second interaction head 8, simultaneously to the formation of the first interaction head 7. In particular, in the case where the storage medium 4 comprises ferroelectric material, the first interaction head 7 can be a read head, whilst the second interaction head 8 can be a write head, which enables re-writing of data previously erased during the reading step.

The second embodiment differs from the first embodiment described in the shape of the first and second etching masks 19, 21.

Figure 11:
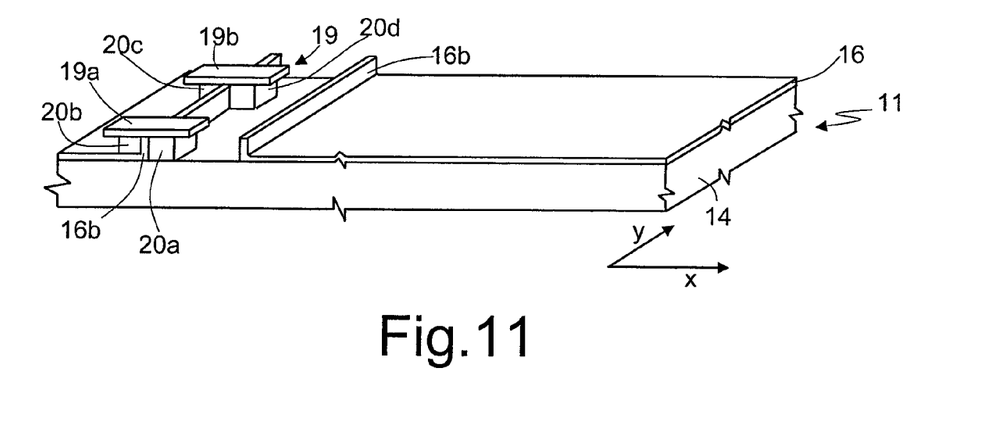
FIGS. 11-13 show perspective sections of the wafer of semiconductor material in final steps of a manufacturing process according to a second embodiment of the present invention.

In detail (FIG. 11), the first etching mask 19 comprises in this case a first area 19a, for definition of the insulating portions 20a, 20b belonging to the first interaction head 7, and a second area 19b, for definition of a third insulating portion 20c and a fourth insulating portion 20d which are to form, in a way similar to what has been described previously, the second interaction head 8.

Figure 12:
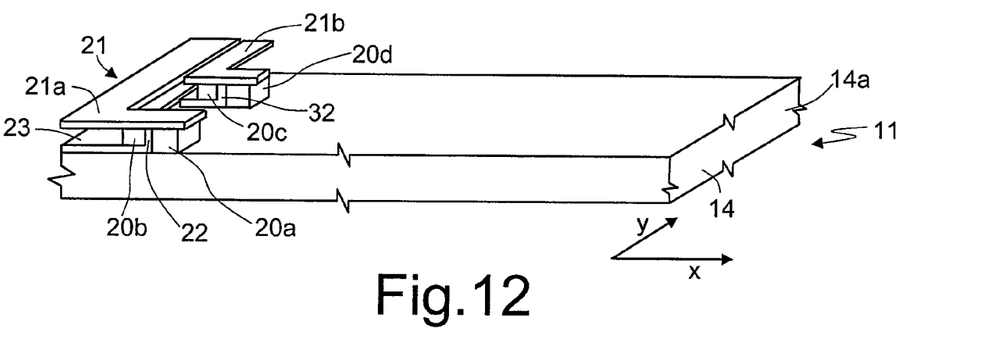

The second etching mask 21 (FIG. 12) has in this case a respective first area 21a for definition of the first conductive region 22 and the first conductive path 23, and a respective second area 21b for definition of a second conductive region 32 and a second conductive path 33 (see also FIG. 13), which is separate and electrically insulated from the first conductive path 23.

Figure 13:
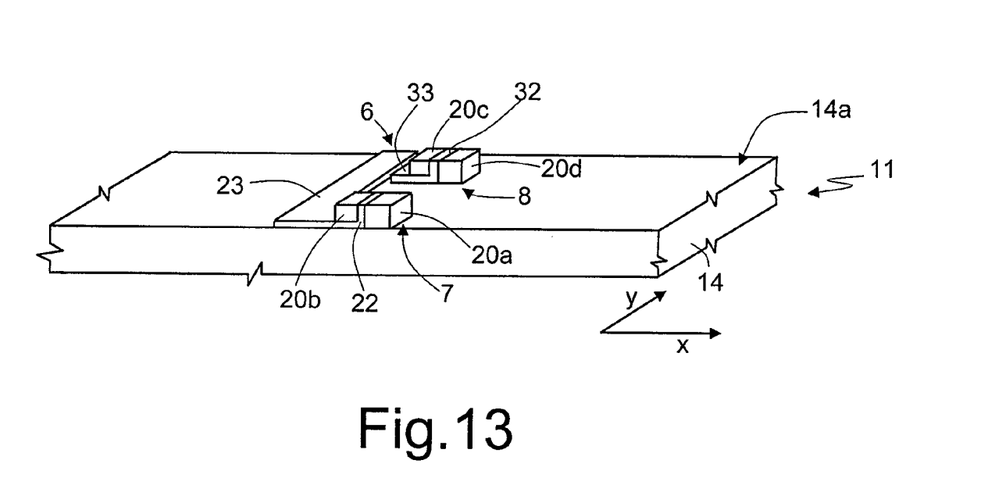

FIG. 13 shows the interaction structure 6 thus formed on the epitaxial layer 14, prior to the release of the supporting element. It should in particular be noted that the alignment between the first interaction head 7 and the second interaction head 8 (and, in particular, between the first conductive region 22 and the second conductive region 32) of the interaction structure 6 is automatically guaranteed in the second direction y by the process described.

The advantages of the process are clear from the foregoing description.

In any case, it is underlined that the described process provides, in a simple and inexpensive way, one or more interaction heads 7, 8 having a smaller dimension $W_1$ that is sub-lithographic. In particular, definition of the smaller dimension $W_1$ of the conductive regions 22, 32 of the interaction heads (critical dimension of the process) is obtained and controlled with precision via non-lithographic standard processes of deposition of a conformable conductive layer, the thickness of the deposited layer coinciding with said smaller dimension. The advantage that this feature enables is evident: the process is rendered independent of the costs and technological limits linked to the purely photolithographic processes (which up to now cannot achieve such small dimensions). In addition, as described, also a larger dimension $W_2$ of said conductive regions is defined without resorting to costly lithographic masks having sub-micrometric dimensions.

The process described further provides an interaction structure 6 having a number of heads integrated on one and the same supporting element 5, made of silicon. Thanks to said process, a self-alignment between said heads can also be guaranteed.

Said solution is particularly advantageous for implementing a process of re-writing of the data in the same position of the ferroelectric storage medium from which they have been read (and erased).

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

In particular, the described dimensions are to be understood as purely indicative and can consequently undergo variations; for example, the smaller dimension $W_1$ of the interaction head could be other than 20 nm, for example, between 1 and 50 nm, and the larger dimension $W_2$ could be between 50 and 100 nm.

The interaction structure 6 can be associated to storage media made of non-ferroelectric material or used in any application in which a sub-lithographic smaller interaction dimension is required.

In addition, once the smaller dimension $W_1$ of the interaction head has been defined via conformable deposition, the subsequent etches that lead to the definition of the head itself can also differ from the one illustrated. For example, the order of the etchings of the insulating and conductive layers could be reversed.

With the described process, a number of interaction heads higher than two can clearly be made by modifying appropriately the etching masks. In addition, the heads thus made may even not be aligned to one another, but arranged according to any desired configuration.

Finally, thanks to the fact that the manufacturing of the interaction structure envisages a cold process, the interaction structure can advantageously be formed also on finished CMOS structures, in the so-called post-processing stage (consequently, not only on an epitaxial layer of a SOI wafer, as illustrated in the figures). In this case, the top surface 14a will be the top surface of a CMOS structure (or wafer).

The invention claimed is:

1. A process for manufacturing an interaction structure for a storage medium, comprising:
    forming a first interaction head with a first conductive region having a sub-lithographic first dimension in a first direction, wherein forming the first interaction head comprises:
        forming on a surface a first delimitation region having a side wall;
        depositing a conductive portion, having a deposition thickness substantially matching said sub-lithographic first dimension, on said side wall, the conductive portion including a side portion extending on said side wall and having a second dimension in a second direction transverse to the first direction and parallel to the surface; and
        defining said first conductive region by subsequently etching the side portion of said conductive portion, the defining including forming said first conductive region with a third dimension in the second direction that is less than the second dimension of the side portion.

2. The process according to claim 1 wherein said sub-lithographic first dimension is between 1 and 50 nm.

3. The process according to claim 1, further comprising controlling said sub-lithographic first dimension by controlling the deposition thickness of said conductive portion.

4. The process according to claim 1 wherein said first delimitation region defines a step and said side wall is substantially vertical and perpendicular to said surface, and wherein depositing said conductive portion comprises depositing, in a substantially conformable manner on said first delimitation region, a conductive layer having said deposition thickness.

5. The process according to claim 4 wherein forming said first interaction head further comprises:
    forming a second delimitation region on a free surface of the side wall of said conductive portion, the side wall of the conductive portion having a contact surface opposite to the free surface and contacting said first delimitation region;
    planarizing said second delimitation region and said conductive layer in such a manner as to expose said conductive portion and said first delimitation region; and
    etching said first and second delimitation regions after completing said planarizing, said step of etching said conductive portion being subsequent to said step of etching said first and second delimitation regions.

6. The process according to claim 5 wherein forming the second delimitation region comprises depositing a delimitation layer on said conductive layer and planarizing the delimitation layer.

7. The process according to claim 5 wherein etching said first and second delimitation regions comprises:
    forming a first etching mask, and
    defining a first delimitation portion and a second delimitation portion, respectively, laterally and on opposite sides of said conductive portion by etching, through said first etching mask, said first and second delimitation regions; said step of defining the first delimitation portion and the second delimitation portion comprising defining a main dimension of said first and second delimitation portions in the second direction, which is substantially orthogonal to said first direction.

8. The process according to claim 7 wherein etching the side wall of said conductive portion comprises:
    forming a second etching mask, and
    defining said first conductive region and a conductive path connected to said first conductive region and arranged partially underneath said second delimitation portion, by etching, through said second etching mask, said the conductive layer.

9. The process according to claim 1 wherein said third dimension is between 50 and 100 nm.

10. The process according to claim 7 wherein said first and second delimitation portions comprise an insulating material, in particular silicon oxide or silicon nitride.

11. The process according to claim 1, further comprising forming a second interaction head, provided with a second conductive region having a sub-lithographic dimension parallel to said first direction, simultaneously with said step of forming the first interaction head, wherein etching the side portion of said conductive portion defines the first and second conductive regions and defines a space between the first and second conductive regions.

12. The process according to claim 11 wherein said first and second interaction heads are aligned in the second direction, which is substantially orthogonal to said first direction.

13. The process according to claim 11, wherein:
    said first delimitation region defines a step and said side wall is substantially vertical and perpendicular to said surface, and wherein depositing said conductive portion comprises depositing, in a substantially conformable manner on said first delimitation region, a conductive layer having said deposition thickness;
    forming said first interaction head further comprises:
        forming a second delimitation region on a free wall of said conductive portion, the conductive portion having a contact wall opposite to the free wall and contacting said first delimitation region;
        planarizing said second delimitation region and said conductive layer in such a manner as to expose said conductive portion and said first delimitation region; and
        etching said first and second delimitation regions, said step of etching said conductive portion being subsequent to said step of etching said first and second delimitation regions, wherein etching said first and second delimitation regions comprises:
            forming a first etching mask, and
            defining a first delimitation portion and a second delimitation portion, respectively, laterally and on opposite sides of said conductive portion by etching, through said first etching mask, said first and second delimitation regions; said step of defining the first delimitation portion and the second delimitation portion comprising defining a main dimension of said first and second delimitation portions in a second direction substantially orthogonal to said first direction;
    etching the side wall of said conductive portion comprises:
        forming a second etching mask, and
        defining said first conductive region and a conductive path connected to said first conductive region and arranged partially underneath said second delimitation portion, by etching said the conductive layer through said second etching mask; and
    forming said second interaction head comprises:
        defining a third delimitation portion and a fourth delimitation portion laterally and on opposite sides of the side wall of said conductive portion by the etching through said first etching mask; and defining said second conductive region, between said third delimitation portion and said fourth delimitation portion, and a second conductive path connected to said second conductive region, by said etching through said second etching mask; said first and second conductive paths being electrically isolated from one another.

14. The process according to claim 1, further comprising forming a plurality of further interaction heads, provided with respective conductive regions having a sub-lithographic dimension in said first direction, simultaneously with said step of forming the first interaction head.

15. The process according to claim 1 wherein said first conductive region has a substantially rectangular section in a plane parallel to said surface.

16. The process according to claim 1 wherein said surface is a top surface of a CMOS structure.

17. A process for manufacturing a transducer for a storage medium, comprising:
forming an interaction structure, the forming including:
forming a first interaction head with a first conductive region having a sub-lithographic first dimension in a first direction, wherein forming the first interaction head comprises:
forming on a top surface of a substrate a first delimitation region having a side wall;
depositing a conductive portion, having a deposition thickness substantially matching said sub-lithographic first dimension, on said side wall; and
defining said conductive region by subsequently etching part of said conductive portion; and
defining a supporting element, having a free end carrying said interaction head, by etching said substrate.

18. The process according to claim 17 wherein said sub-lithographic first dimension is between 1 and 50 nm.

19. The process according to claim 17 wherein said first delimitation region defines a step and said side wall is substantially vertical and perpendicular to said surface, and wherein depositing said conductive portion comprises depositing, in a substantially conformable manner on said first delimitation region, a conductive layer having said deposition thickness.

20. The process according to claim 19 wherein forming said first interaction head further comprises:
forming a second delimitation region on a free wall of said conductive portion, the conductive portion having a contact wall opposite to the free wall and contacting said first delimitation region;
planarizing said second delimitation region and said conductive layer in such a manner as to expose said conductive portion and said first delimitation region; and
etching said first and second delimitation regions, said step of etching said conductive portion being subsequent to said step of etching said first and second delimitation regions.

21. The process according to claim 20 wherein etching said first and second delimitation regions comprises:
forming a first etching mask, and
defining a first delimitation portion and a second delimitation portion, respectively, laterally and on opposite sides of said conductive portion by etching, through said first etching mask, said first and second delimitation regions; said step of defining the first delimitation portion and the second delimitation portion comprising defining a main dimension of said first and second delimitation portions in a second direction substantially orthogonal to said first direction.

22. The process according to claim 21 wherein etching said conductive portion comprises:
forming a second etching mask, and
defining a second dimension, larger than the first dimension, of said first conductive region in said second direction between said first delimitation portion and said second delimitation portion, and a conductive path connected to said first conductive region and arranged partially underneath said second delimitation portion, by etching, through said second etching mask, said the conductive layer.

23. The process according to claim 17, wherein forming the interaction structure includes forming a second interaction head, provided with a second conductive region having a sub-lithographic dimension in said first direction, simultaneously with said step of forming the first interaction head.

24. The process according to claim 23 wherein said first and second interaction heads are aligned in a second direction substantially orthogonal to said first direction.

25. The process according to claim 17, wherein:
the conductive portion includes a side portion extending on said side wall and having a second dimension in a second direction transverse to the first direction and parallel to the surface; and
defining said conductive region by subsequently etching the side portion of said conductive portion, the defining including forming said conductive region with a third dimension in the second direction that is less than the second dimension of the side portion.

26. A process for manufacturing a storage device, comprising:
forming a storage medium; and
forming a transducer extending on top of the storage medium, wherein forming the transducer includes:
forming an interaction structure, wherein the forming the interaction structure includes: forming a first interaction head with a first conductive region having a sub-lithographic first dimension in a first direction, wherein forming the first interaction head comprises:
forming on a top surface of a substrate a first delimitation region having a side wall;
depositing a conductive portion, having a deposition thickness substantially matching said sub-lithographic first dimension, on said side wall; and
defining said conductive region by subsequently etching part of said conductive portion; and
defining a supporting element, having a free end carrying said interaction head, by etching said substrate.

27. The process according to claim 26 wherein said sub-lithographic first dimension is between 1 and 50 nm.

28. The process according to claim 26 wherein said first delimitation region defines a step and said side wall is substantially vertical and perpendicular to said surface, and wherein depositing said conductive portion comprises depositing, in a substantially conformable manner on said first delimitation region, a conductive layer having said deposition thickness.

29. The process according to claim 28 wherein forming said first interaction head further comprises:
forming a second delimitation region on a free wall of said conductive portion, the conductive portion having a contact wall opposite to the free wall and contacting said first delimitation region;

planarizing said second delimitation region and said conductive layer in such a manner as to expose said conductive portion and said first delimitation region; and etching said first and second delimitation regions, said step of etching said conductive portion being subsequent to said step of etching said first and second delimitation regions.

30. The process according to claim 29 wherein etching said first and second delimitation regions comprises:

forming a first etching mask, and defining a first delimitation portion and a second delimitation portion, respectively, laterally and on opposite sides of said conductive portion by etching, through said first etching mask, said first and second delimitation regions; said step of defining the first delimitation portion and the second delimitation portion comprising defining a main dimension of said first and second delimitation portions in a second direction substantially orthogonal to said first direction.

31. The process according to claim 30 wherein etching said conductive portion comprises:

forming a second etching mask, and defining a second dimension, larger than the first dimension, of said first conductive region in said second direction between said first delimitation portion and said second delimitation portion, and a conductive path connected to said first conductive region and arranged partially underneath said second delimitation portion, by etching, through said second etching mask, said the conductive layer.

32. The process according to claim 26, wherein forming the interaction structure includes forming a second interaction head, provided with a second conductive region having a sub-lithographic dimension in said first direction, simultaneously with said step of forming the first interaction head.

33. The process according to claim 32 wherein said first and second interaction heads are aligned in a second direction substantially orthogonal to said first direction.

34. The process according to claim 26, wherein:

the conductive portion includes a side portion extending on said side wall and having a second dimension in a second direction transverse to the first direction and parallel to the surface; and defining said conductive region by subsequently etching the side portion of said conductive portion, the defining including forming said conductive region with a third dimension in the second direction that is less than the second dimension of the side portion.

35. A process for manufacturing an interaction structure for a storage medium, comprising:

forming a first interaction head with a first conductive region having a sub-lithographic first dimension in a first direction, wherein forming the first interaction head comprises:

forming on a surface a first delimitation region having a side wall;

depositing a conductive layer, having a deposition thickness substantially matching said sub-lithographic first dimension, on said side wall and on said surface, the conductive layer including a side wall contacting said side wall of the first delimitation region and a bottom portion contacting the surface and extending laterally from the side wall;

forming a second delimitation region on the conductive layer, the second delimitation region having side and bottom walls respectively contacting the side portion and bottom portion of the conductive layer;

planarizing the first and second delimitation regions and the side portion of the conductive layer;

forming first and second delimitation portions from the first and second delimitation regions, respectively, by etching said first and second delimitation regions after planarizing the first and second delimitation regions and the side portion of the conductive layer, wherein forming the first and second delimitation portions includes defining a main dimension of said first and second delimitation portions in a second direction substantially orthogonal to said first direction and leaving in place the bottom wall of the conductive layer.

36. The process according to claim 35, wherein forming the first and second delimitation portions includes:

forming a first etching mask, and defining the first delimitation portion and the second delimitation portion, respectively, laterally and on opposite sides of said conductive portion by etching said first and second delimitation regions while protecting the first and second delimitation portions with said first etching mask.

37. The process according to claim 35, further comprising etching said side wall of the conductive layer after the planarizing, wherein etching said side wall of the conductive layer includes:

forming a second etching mask, and defining a second dimension, larger than the first dimension, of said first conductive region in said second direction by etching said side wall of the conductive layer while protecting a portion of the side wall of the conductive layer with said second etching mask.

* * * * *